(12) United States Patent
Yamazaki

(10) Patent No.: US 7,058,435 B2
(45) Date of Patent: *Jun. 6, 2006

(54) PORTABLE TERMINAL DEVICE WITH CONNECTOR SECTION

(75) Inventor: Masato Yamazaki, Yokohama (JP)

(73) Assignee: Kyocera Corporation, Kyoto (JP)

( * ) Notice: Subject to any disclaimer, the term of this patent is extended or adjusted under 35 U.S.C. 154(b) by 120 days.

This patent is subject to a terminal disclaimer.

(21) Appl. No.: 10/894,564

(22) Filed: Jul. 20, 2004

(65) Prior Publication Data

US 2005/0037820 A1 Feb. 17, 2005

(30) Foreign Application Priority Data

Jul. 23, 2003 (JP) .............................. 2003-200662

(51) Int. Cl.
*H04B 1/38* (2006.01)
*H04M 1/00* (2006.01)

(52) U.S. Cl. .............................. 455/575.8; 455/575.1; 455/90.3; 455/128; 455/347

(58) Field of Classification Search ............ 455/575.8, 455/575.1, 90.3, 128, 347
See application file for complete search history.

(56) References Cited

U.S. PATENT DOCUMENTS 5,964,614 A * 10/1999 Daoud ........................ 439/417
6,814,595 B1 * 11/2004 Miyamoto et al. .......... 439/148
2002/0198018 A1* 12/2002 Benson ........................ 455/551
2004/0198247 A1* 10/2004 Jokinen et al. ............. 455/90.1

FOREIGN PATENT DOCUMENTS

EP     001049210 A1 * 11/2000
JP       01270417 A  * 10/1989
JP       2003-125046    4/2003

* cited by examiner

*Primary Examiner*—Sonny Trinh
*Assistant Examiner*—Huy Phan
(74) *Attorney, Agent, or Firm*—Hogan & Hartson, LLP

(57) ABSTRACT

A portable terminal device includes a connector that opens from a lateral surface of a case and electrically connects with another terminal device, an elastic connector cap that opens and closes an opening of the case, and a holder that maintains the opening in a closed state. The connector cap includes a first wall that protrudes perpendicularly to the lateral surface from a periphery of the opening located on one end of the case, and a second wall that protrudes from the other end of the case, is continuous with the first wall, and is coupled to swing freely to the other end. When the opening is closed, the first wall is exposed on a top surface of the case roughly perpendicularly to the thickness direction, and its distal end is located farther away from the opening relative to a coupling section of the second wall.

8 Claims, 4 Drawing Sheets

PORTABLE TERMINAL DEVICE WITH CONNECTOR SECTION

BACKGROUND OF THE INVENTION

1. Field of the Invention

The present invention relates to a portable terminal device such as a cellular telephone or personal digital assistant (PDA) equipped with a connector section for electrically connecting with various types of terminal devices.

Priority is claimed on Japanese Patent Application No. 2003-200662 filed on Jul. 23, 2003, the content of which is incorporated herein by reference.

2. Description of Related Art

A conventional portable terminal device is provided with a connector section for performing data communications by electrically connecting with a PDA, laptop computer and various other types of terminal devices (see, for example, Japanese Unexamined Patent Application, First Publication No. 2003-125046). This connector section is fixed inside a case formed into the shape of a plate, and is composed so as to open to the outside from a lateral surface of the case. In addition, this portable terminal device is provided with a connector cap capable of closing the opening of the case, and a holding unit for maintaining the closed state of the case opening by the connector cap.

The connector cap is coupled to a peripheral edge of the opening in the case to swing freely. In addition, the connector cap makes contact with a peripheral wall section of the case located at the peripheral edge of the opening while the opening is closed.

In order for the connector section to open to the outside from this closed state, a user inserts the fingernail between the peripheral wall section and the connector cap to move the connector cap away from the case.

However, in the aforementioned conventional portable terminal device, since it was necessary to insert a fingernail between the connector cap and the peripheral wall section of the case, it had a problem in difficulty to remove the connector cap. In the case that a user has short fingernails in particular, since a fingernail is unable to be inserted between the connector cap and the lateral surface of the case, it had a problem of not allowing the connector cap to be removed.

In addition, there was also a problem of the coated surface of the case ending up being scratched by a fingernail when the connector section is opened with a fingernail.

SUMMARY OF THE INVENTION

In consideration of the aforementioned circumstances, an object of the present invention is to provide a portable terminal device in which the connector cap can be easily removed from the opening in the case.

In order to achieve the aforementioned object, a portable terminal device of the present invention is provided with: a case section formed into the shape of a plate; a connector section that opens to the outside from a lateral surface of the case section along the direction of thickness and electrically connects with another terminal device; a connector cap formed from an elastic body that opens and closes an opening of the case section; and a holding unit that maintains the opening in a closed state, wherein, the connector cap is provided with a first wall section that protrudes roughly perpendicularly to the lateral surface from a peripheral edge of the opening located on one end of the case section in the direction of thickness, and a second wall section that protrudes from the other end of the case section in the direction of thickness and is continuous with the first wall section, the second wall section is coupled to the other end of the case section in the direction of thickness to swing freely, and in a state in which the opening is closed, the first wall section being exposed on a top surface of the case section substantially perpendicularly to the direction of thickness of the case section, with a distal end section of the first wall section located farther away from the opening relative to the coupling section between the second wall section and the case section.

In addition, in the portable terminal device of the present invention, a gap may be formed between the second wall section and the opening in a state in which the opening is closed by the connector cap.

Moreover, in the portable terminal device of the present invention, the case section may be composed of two cases that can be overlapped together, the connector section and the connector cap may be provided on at least one of the cases, a coupling unit may be provided that couples the two cases so as to be able to mutually pivot about a reference axis, and in a state in which the two cases are overlapped together, the first wall section exposed on the surface of one case may be hidden by the other case.

Furthermore, in the portable terminal device of the present invention, the connector section may be formed to have a comb-shaped cross-section, and may further comprise: at least one protruding section which is provided on the second wall section and protrudes towards the connector section to be inserted into the connector section in a state in which the opening is in a closed state.

Furthermore, in the portable terminal device of the present invention, substantially no level difference may be formed at a seam between the second wall section of the connector cap and the lateral surface.

Furthermore, in the portable terminal device of the present invention, the second wall section of the connector cap and the lateral surface may have a common surface.

Furthermore, in the portable terminal device of the present invention, the portable terminal device may be a cellular telephone in which one of the two cases has in the inner surface an input section, a microphone section, the connector section, and the connector cap, and in which the other of the two cases has in the inner surface a display section and a speaker section so that the inner surfaces of the two cases face each other in a state in which the two cases are overlapped together.

According to the present invention, as a result of pressing with a finger on the first wall section of the connector cap from the surface of a case, the coupling section of the second wall section becomes elastically deformed, the connector cap swings about this coupling section, and thus the connector cap can easily be removed from the case opening.

In addition, since it is not necessary to open the case opening with a fingernail, damage to the coated surface of the case can be prevented.

DETAILED DESCRIPTION OF THE INVENTION

Figure 1:
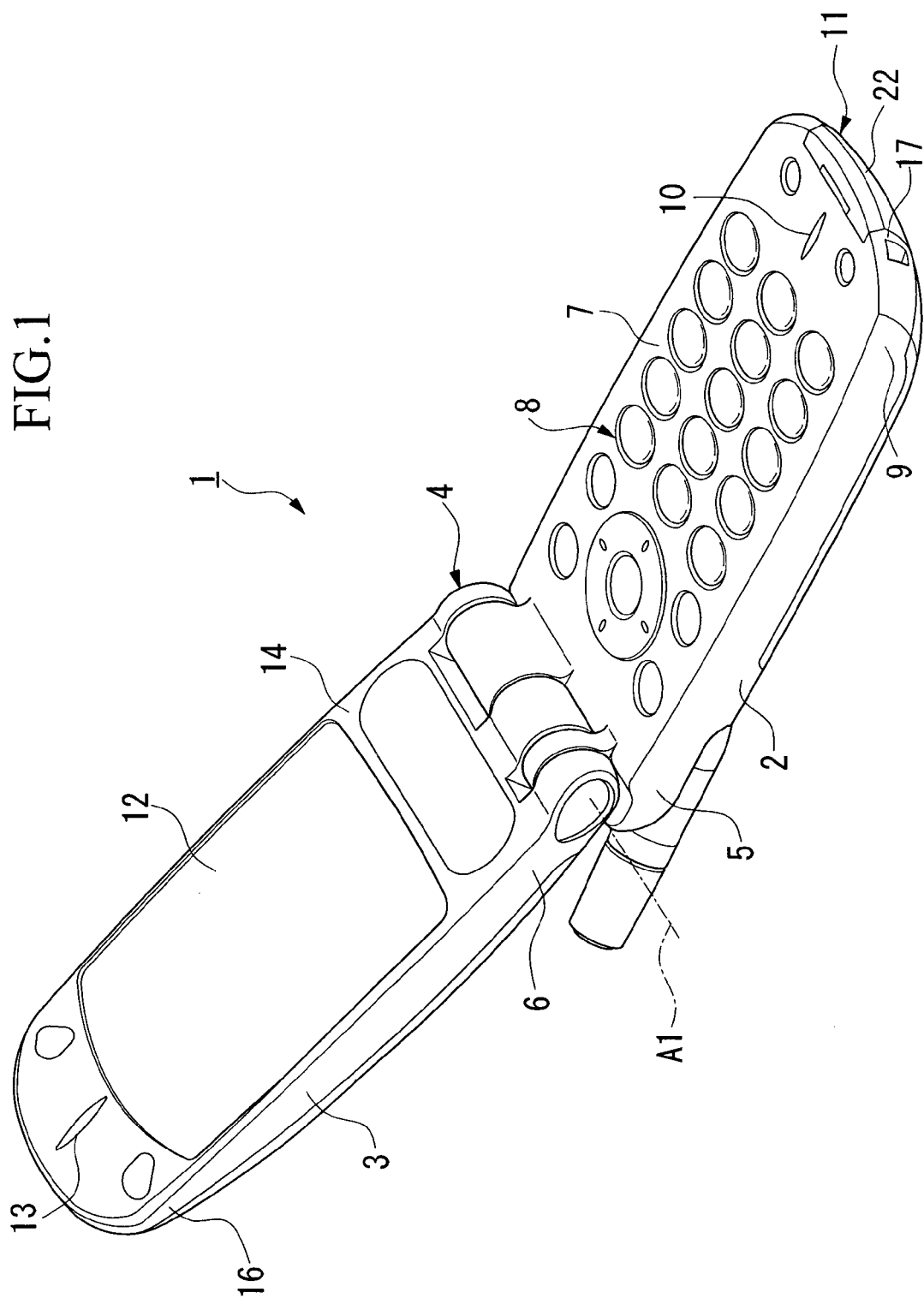
FIG. 1 is a perspective view of the state in which first and second cases are mutually opened as viewed from the inside in a cellular telephone according to one embodiment of the present invention.

FIGS. 1 through 6 show an embodiment according to the present invention, and the embodiment explained here refers to the case of applying the present invention to a cellular telephone. As shown in FIG. 1, the cellular telephone (portable terminal device) 1 of the present embodiment is composed by coupling a first case 2 and a second case 3, which are formed into the shape of a plate and can be overlapped together, so that they are coupled by a hinge section (coupling unit) 4 so as to be able to be mutually folded. Hinge section 4 is disposed on end sections 5 and 6 (hereinafter referred to as proximal end sections 5 and 6) in the lengthwise direction of the two cases 2 and 3, and the two cases 2 and 3 are able to mutually pivot about reference axis A1.

An input section 8 composed of a call key, an end key, number keys and various other pressable operating keys is provided on an inner surface (top) 7 of first case 2. In addition, a microphone section 10 and a connector unit 11 are provided on distal end section 9 located on the opposite side of proximal end section 5 of first case 2 on this inner surface 7.

A display section 12 and a speaker section 13 are provided within second case 3. Display section 12 displays various information and is arranged so as to be exposed to the inner surface 14 on the second case 3. Speaker section 13 is used together with the aforementioned microphone section 10 when calling, and is exposed to the side of inner surface 14 on the second case 3 located on distal end section 16 on the opposite side of proximal end section 6.

Furthermore, inner surfaces 7 and 14 of first and second cases 2 and 3 respectively indicate mutually opposing surfaces in the state in which the two cases 2 and 3 are closed by being overlapped together.

Figure 2:
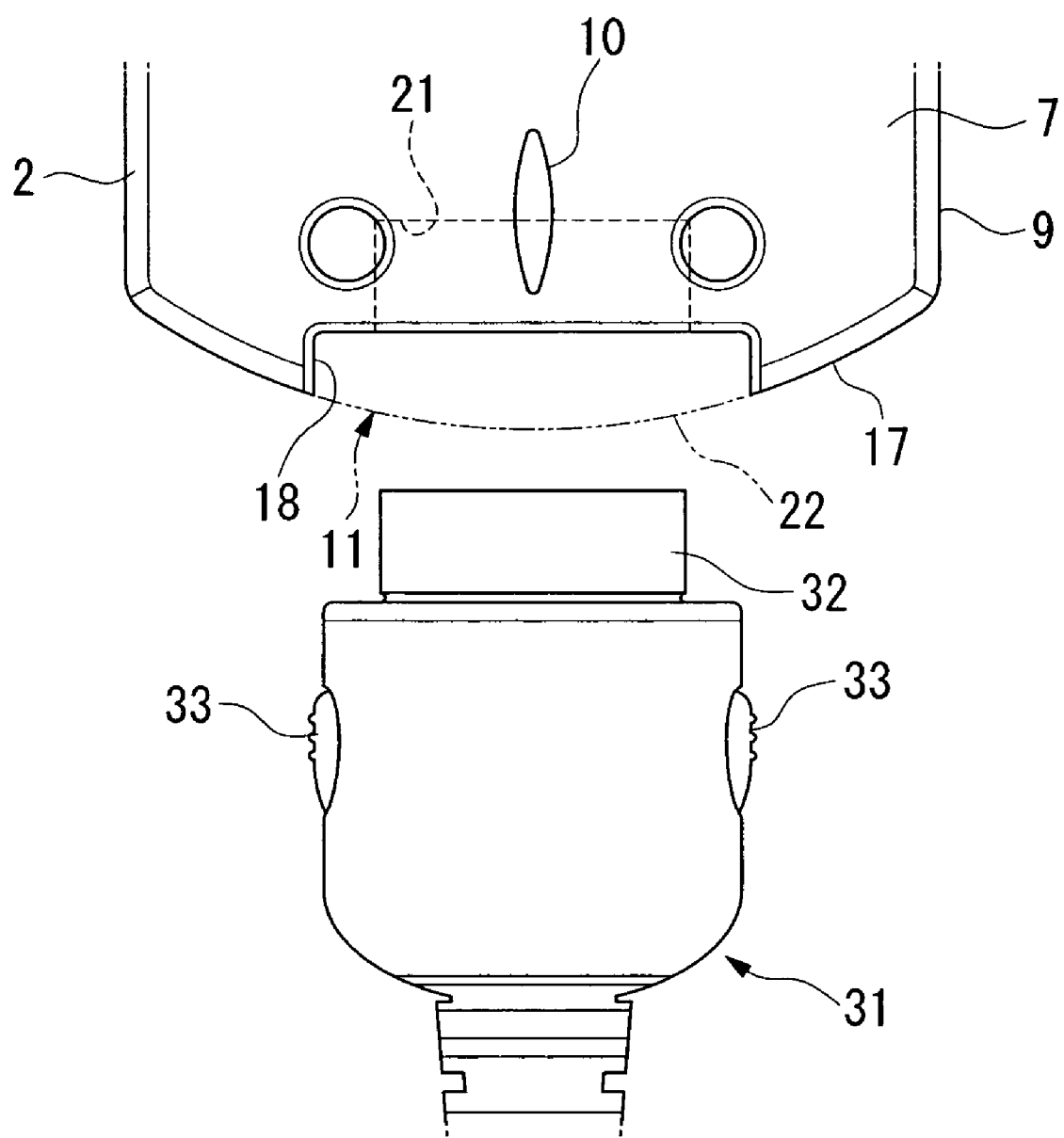
FIG. 2 is an enlarged plan view showing the state in which a plug has been removed from a connector section in the cellular telephone of FIG. 1.

As shown in FIG. 2, a notch section 18, which appears roughly rectangular when viewed from overhead and is formed by being indented from lateral surface 17 of first case 2, and hereby is formed along the direction of thickness of first case 2 in distal end section 9 of first case 2 provided with connector unit 11. Connector unit 11 is composed of connector section 21 provided within first case 2, and connector cap 22 able to fill in the region of notch section 18.

Figure 3:
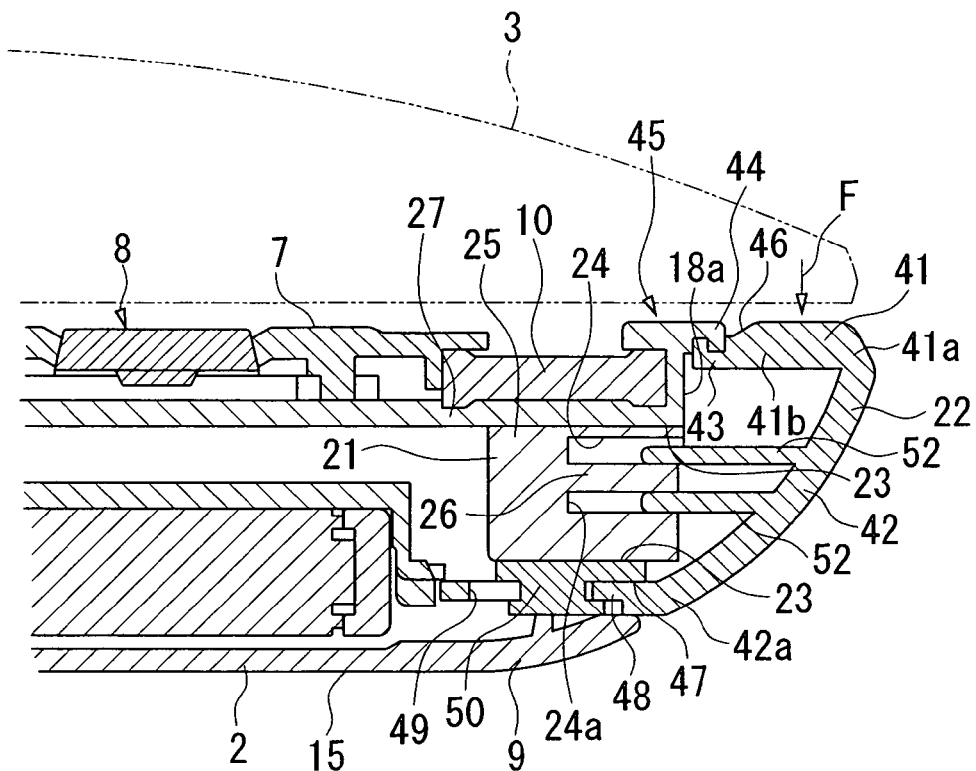
FIG. 3 is an enlarged cross-sectional view showing the vicinity of the distal end section of a first case in the cellular telephone of FIG. 1.

As shown in FIG. 3, connector section 21 is exposed to the outside from an opening 23 formed in bottom surface (lateral surface) 18a of notch section 18 along the direction of thickness of first case 2. This connector section 21 is formed to have a comb-shaped cross-section, and is provided with a casing 25 in which insertion holes 24 are formed for inserting a plug (not shown), and a connection terminal 26 that protrudes towards opening 23 of first case 2 from bottom surface 24a of insertion holes 24.

Casing 25 is mounted on a circuit board 27 provided within the first case 2, and connection terminal 26 is electrically connected with circuit board 27. This connection terminal 26 electrically connects cellular telephone 1 with a PDA, a laptop computer or other terminal devices by inserting a plug into insertion holes 24.

Figure 4:
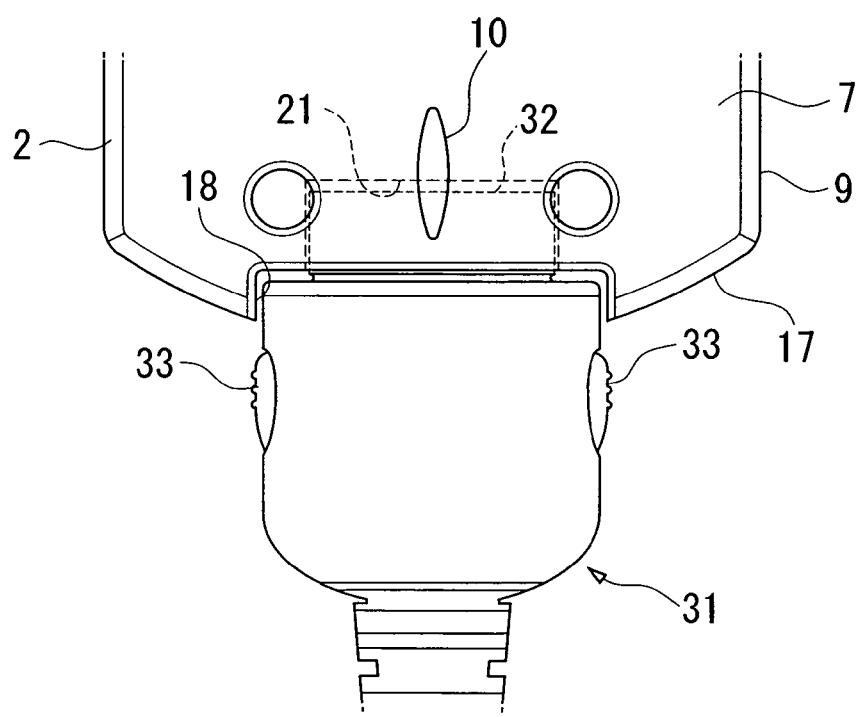
FIG. 4 is an enlarged plan view showing the state in which a plug is inserted into a connector section in the cellular telephone of FIG. 1.

Furthermore, as shown in FIG. 2, a plug 31 that is inserted into this connector section 21 is provided with grips 33 that a user grabs with the fingers when the user inserts and removes connection terminal 32 into and from connector section 21, and these grips 33 are provided on both ends along the widthwise direction of first case 2. Consequently, as shown in FIG. 4, the depth dimension of notch section 18 along the lengthwise direction of first case 2 is preferably as small as the degree to which grips 33 of plug 31 are positioned to the outside of notch section 18 in the state in which connection terminal 32 of plug 31 is inserted into connector section 21.

As shown in FIG. 3, a connector cap 22 is formed from elastically deformable rubber (elastic body), and opens and closes opening 23 of first case 2.

This connector cap 22 is provided with a first wall section 41 that protrudes from the peripheral edge of opening 23 located on the side of inner surface 7 of first case 2 roughly perpendicularly to bottom surface 18a of notch section 18, and a second wall section 42 that protrudes from the peripheral edge of opening 23 located on the side of an outer surface 15 of first case 2 and is continuous with first wall section 41. Namely, these two wall sections 41 and 42 are integrally formed, and second wall section 42 is connected to distal end section 41a of first wall section 41.

Furthermore, outer surface 15 of first case 2 exhibits a surface located on the opposite side from inner surface 7 of first case 2, with inner surface 7 being located on one end in the direction of thickness of fist case 2, and outer surface 15 being located on the other end in the direction of thickness of first case 2.

First wall section 41 is formed in the same plane as inner surface 7 of first case 2 in the state in which opening 23 is blocked, and is hidden by second case 3 in the state in which both cases 2 and 3 are closed by being overlapped together.

An engaging section 43 formed in the shape of a hook is provided on proximal end section 41b of first wall section 41. This engaging section 43 is made to engage with a locking section 44 formed on the peripheral edge of opening 23 located on the side of inner surface 7 of first case 2. An engaging unit (holding unit) 45 that maintains opening 23 in a blocked state is composed by this engaging section 43 and locking section 44.

In addition, an indentation 46 that is indented from inner surface 7 of case 2 is formed at the seam between proximal end section 41b of first wall section 41 and case 2. This indentation 46 fulfills the role of guiding a fingernail into the seam between proximal end section 41b of first wall section 41 and case 2 in the case of using a fingernail to remove connector cap 22 from opening 23.

Second wall section 42 is arranged so that there is a gap in opening 23 in the state in which opening 23 of first case 2 is blocked, and is coupled to first case 2 to swing freely.

Namely, an insertion hole 47 is formed in the peripheral edge of opening 23 located on the side of outer surface 15 of first case 2, and second wall section 42 is provided with an inserting wall section 48 that can be inserted into this insertion hole 47. A through hole 49 is formed in inserting wall section 48, and an engaging section 50 that passes through the through hole 49 is formed inside insertion hole 47. The aforementioned coupling section between second wall section 42 and first case 2 shows inserting wall section 48 located at the open end of insertion hole 47. As a result of elastically deforming inserting wall section 48 at this open end, connector cap 22 can be swung with respect to first case 2.

Furthermore, in the state in which opening 23 is blocked by connector cap 22, distal end section 41a of first wall section 41 is located farther away from opening 23 relative to the coupling section of second wall section 42.

A pair of protruding sections 52 are formed at an intermediate point of second wall section 42 protruding towards the side of connector section 21. These protruding sections 52 are inserted into a casing 25 of connector section 21 in the state in which opening 23 is blocked by connector cap 22, protect connection terminal 26 by clamping both sides thereof, and positions second wall section 42 relative to connector section 21.

Figure 5:
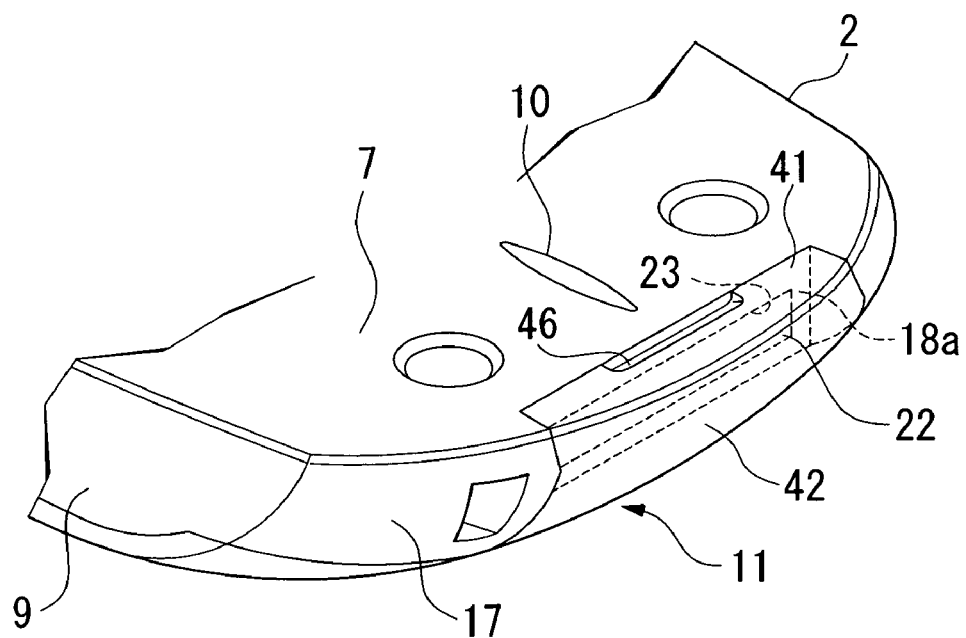
FIG. 5 is an enlarged perspective view showing the vicinity of the distal end section of a first case in the cellular telephone of FIG. 1.

Furthermore, as shown in FIG. 5, first wall section 41 forms the same curve as lateral surface 17 located on the side of distal end section 9 of first case 2 along the widthwise direction of first case 2 in the state in which opening 23 is blocked. In addition, second wall section 42 forms the same curve as lateral surface 17 of first case 2 along the direction of thickness of first case 2.

On the basis of the above, since a level difference is not formed at the seam between connector cap 22 and lateral surface 17 of the first case, a design having a satisfactory appearance is formed at distal end section 9 of first case 2 provided with connector unit 11.

The following provides an explanation of the method for using cellular telephone 1 as composed in the manner described above.

In the case of carrying out, for example, data communication between this cellular telephone 1 and another terminal device in the state in which opening 23 is blocked by connector cap 22, both cases 2 and 3 are mutually opened and as shown in FIG. 3, first wall section 41 is pressed with the fingers from the side of inner surface 7 of first case 2 in the direction towards outer surface 15 (direction F).

At this time, since distal end section 41a of first wall section 41 is arranged at a location farther away from opening 23 of first case 2 relative to the coupling section of second wall section 42, second wall section 42 is elastically deformed and moves in direction F.

Figure 6:
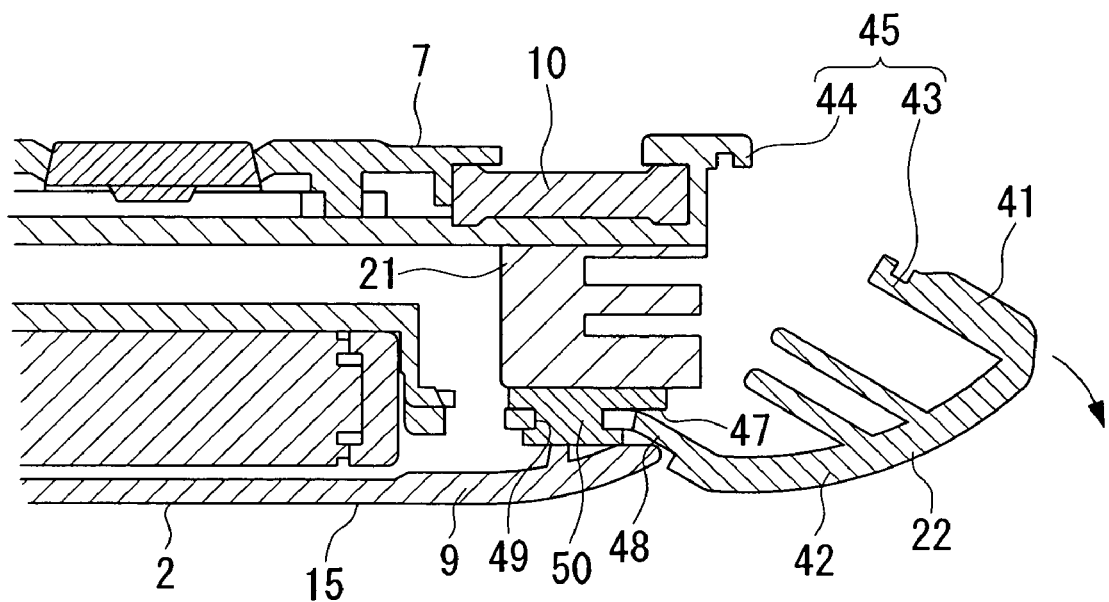
FIG. 6 is an enlarged cross-sectional view showing the vicinity of the distal end section of a first case in the cellular telephone of FIG. 1.

Consequently, as shown in FIG. 6, engaging section 43 disengages from locking section 44 and together with the engaged state between connector cap 22 and first case 2 affected by engaging unit 45 being canceled, the coupling section of second wall section 42 is elastically deformed. Connector cap 22 then swings about this coupling section, and moves away from opening 23 of first case 2. Finally, as shown in FIG. 4, cellular telephone 1 is electrically connected with another terminal device by inserting plug 31 into connector section 21.

Furthermore, as shown in FIG. 3, when carrying this cellular telephone 1, the two cases 2 and 3 are closed by being overlapped together, enabling cellular telephone 1 to be housed in a briefcase or pocket of clothing. In this state, since first wall section 41 exposed on the side of inner surface 7 of first case 2 is hidden by second case 3, first wall section 41 cannot be pressed in direction F as previously described.

In addition, in the state in which opening 23 is blocked by connector cap 22, even if, for example, cellular telephone 1 is dropped onto the side of distal end section 9 of first case 2, connector cap 22 is elastically deformed, thereby preventing damage to connector section 21.

Namely, in the case an external force has acted on connector cap 22 located at distal end section 9 of first case 2, second wall section 42 moves toward opening 23 as a result of elastic deformation of connector cap 22. Here, in the state in which opening 23 is blocked, since a gap is formed between second wall section 42 and opening 23, the external force is absorbed by the aforementioned elastic deformation.

As has been described above, according to this cellular telephone 1, by pressing first wall section 41 of connector cap 22 with the fingers in direction F from the side of inner surface 7 of first case 2, the coupling section of second wall section 42 elastically deforms, connector cap 22 swings about this coupling section, and hereby connector cap 22 can be easily removed from opening 23 of first case 2.

In addition, since opening 23 is not required to be opened by using a fingernail, the coated surface of first case 2 can be prevented from being damaged.

Moreover, even if an external force acts on distal end section 9 of first case 2 as a result of dropping cellular telephone 1 and so forth, since this external force is not transmitted to connector section 21 as a result of the force being housed in connector cap 22, connector section 21 can be prevented from being damaged.

In addition, since external force that causes opening 23 of first case 2 to open does not act on connector cap 22 when carrying cellular telephone 1 with the two cases 2 and 3 mutually closed, opening 23 can be easily prevented from opening inadvertently.

Furthermore, although a notch section 18 is formed in distal end section 9 of first case 2 in the aforementioned embodiment, opening 23 may also be provided in lateral surface 17 of first case 2 without forming notch section 18. In this case, it is necessary to form lateral surface 17 to be plain along the direction of thickness of first case 2.

In addition, although distal end section 41a of first wall section 41 is positioned farther away from opening 23 relative to the coupling section of second wall section 42, the present invention is not limited to this. For example, in addition to distal end section 41a of first wall section 41, in the state in which opening 23 is closed, inserting wall section 48 of second wall section 42 may be extended outward from the open end of insertion hole 47, and second wall section 42 excluding inserting wall section 48 may be located away from opening 23.

Moreover, although cellular telephone 1 has been explained in which two cases 2 and 3 are coupled to be folded on top of each other by means of hinge section 4, the present invention is not limited to this, but rather, cellular telephone 1 may be in the form of, for example, a cellular telephone in which two cases are coupled to be freely overlapped by means of a rotating axis having a reference axis in the direction of their mutual thickness.

In addition, the present invention is not limited to a cellular telephone 1 composed of two cases 2 and 3, but rather may also be a cellular telephone composed of at least one case. Moreover, the present invention is not limited to a cellular telephone, but rather may also be a PDA, laptop computer or other portable terminal devices.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A portable terminal device comprising:
   a case section formed into the shape of a plate;
   a connector section that opens to the outside from a lateral surface of the case section along the direction of thickness and electrically connects with another terminal device;
   a connector cap formed from an elastic body that opens and closes an opening of the case section; and
   a holding unit that maintains the opening in a closed state,
   wherein the connector cap is provided with a first wall section that protrudes roughly perpendicularly to the lateral surface from a peripheral edge of the opening located on one end of the case section in the direction of thickness, and a second wall section that protrudes from the other end of the case section in the direction of thickness and is continuous with the first wall section,
   the second wall section is coupled to the other end of the case section in the direction of thickness to swing freely, and
   in a state in which the opening is closed, the first wall section being exposed on a top surface of the case section substantially perpendicularly to the direction of thickness of the case section, with a distal end section of the first wall section located farther away from the opening relative to a coupling section between the second wall section and the case section.

2. The portable terminal device according to claim 1, wherein a gap is formed between the second wall section and the opening in a state in which the opening is closed by the connector cap.

3. The portable terminal device according to claim 2, wherein the case section is composed of two cases that can be overlapped together,
   the connector section and the connector cap are provided on at least one of the cases,
   a coupling unit is provided that couples the two cases so as to be able to mutually pivot about a reference axis, and
   in a state in which the two cases are overlapped together, the first wall section exposed on the surface of one case is hidden by the other case.

4. The portable terminal device according to claim 1, wherein the case section is composed of two cases that can be overlapped together,
   the connector section and the connector cap are provided on at least one of the cases,
   a coupling unit is provided that couples the two cases so as to be able to mutually pivot about a reference axis, and
   in a state in which the two cases are overlapped together, the first wall section exposed on the surface of one case is hidden by the other case.

5. A portable terminal device according to claim 4, wherein the portable terminal device is a cellular telephone in which one of the two cases has in the inner surface an input section, a microphone section, the connector section, and the connector cap, and in which the other of the two cases has in the inner surface a display section and a speaker section so that the inner surfaces of the two cases face each other in a state in which the two cases are overlapped together.

6. The portable terminal device according to claim 1, wherein the connector section is formed to have a comb-shaped cross-section, and further comprising: at least one protruding section which is provided on the second wall section and protrudes towards the connector section to be inserted into the connector section in a state in which the opening is in a closed state.

7. The portable terminal device according to claim 1, wherein substantially no level difference is formed at a seam between the second wall section of the connector cap and the lateral surface.

8. The portable terminal device according to claim 1, wherein the second wall section of the connector cap and the lateral surface have a common surface.

* * * * *

UNITED STATES PATENT AND TRADEMARK OFFICE
CERTIFICATE OF CORRECTION

| | |
|---|---|
| PATENT NO. | : 7,058,435 B2 |
| APPLICATION NO. | : 10/894564 |
| DATED | : June 6, 2006 |
| INVENTOR(S) | : Masato Yamazaki |

It is certified that error appears in the above-identified patent and that said Letters Patent is hereby corrected as shown below:

Item [*] Notice
Title Page, delete "This patent is subject to a terminal disclaimer".

Signed and Sealed this

Fifteenth Day of May, 2007

JON W. DUDAS
*Director of the United States Patent and Trademark Office*